No. 858,165. PATENTED JUNE 25, 1907.
W. D. EDMONDS.
TRAMMEL FOR ANIMALS.
APPLICATION FILED DEC. 31, 1906.
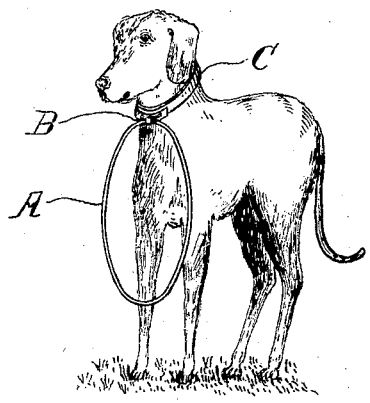
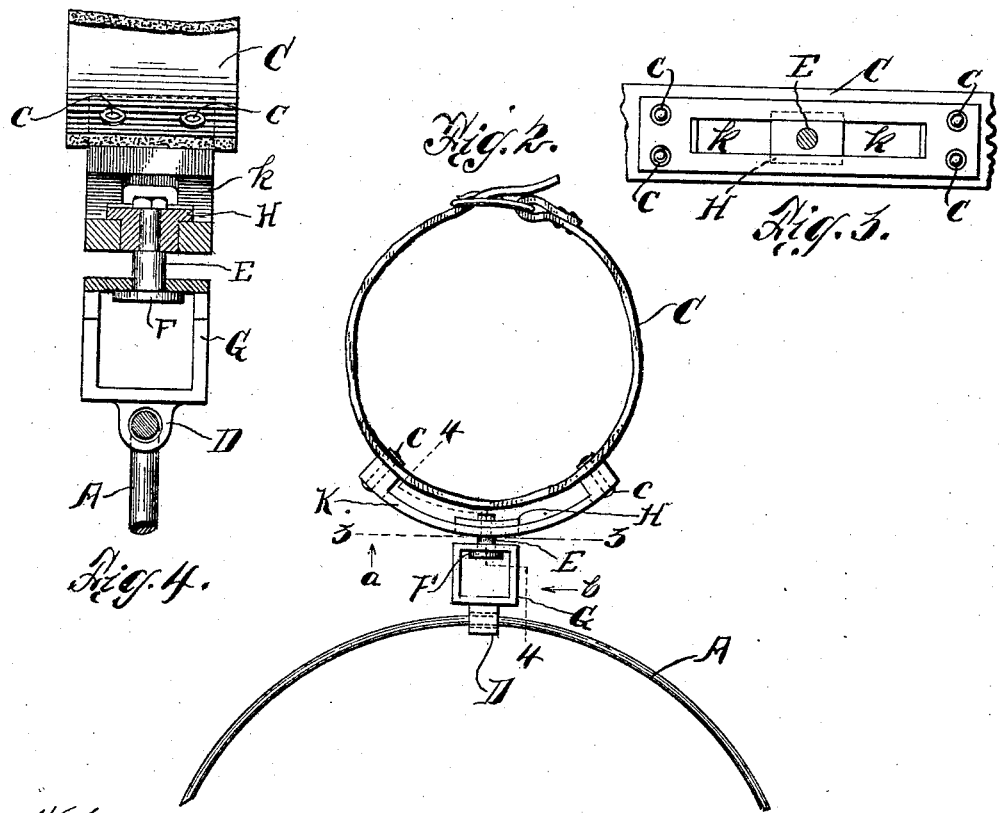
Witnesses:
C. A. Jarvis
George G. Measures
Inventor:
Walter D. Edmonds
By Philip Eck
Attorney

UNITED STATES PATENT OFFICE.

WALTER D. EDMONDS, OF BOONVILLE, NEW YORK.

TRAMMEL FOR ANIMALS.

No. 858,165.            Specification of Letters Patent.            Patented June 25, 1907.

Application filed December 31, 1906. Serial No. 350,248.

*To all whom it may concern:*

Be it known that I, WALTER D. EDMONDS, a citizen of the United States, and a resident of the town of Boonville, in the county of Oneida and State of New York, have invented certain new and useful Improvements in Trammels for Animals, Particularly Dogs, of which the following is a specification, reference being had to the accompanying drawings, in which—

Figure 1 is a perspective view of my trammel applied to a dog; Fig. 2 a front view of my invention, showing combination of collar with trammel, the latter being partly broken away; Fig. 3 a detail on an enlarged scale, partly in section, taken on the line 3—3 of Fig. 2, looking in the direction of the arrow *a;* Fig. 4 another detail, partly in section, taken on the line 4—4 of Fig. 2, looking in the direction of the arrow *b*.

The object of my invention is to provide means whereby, without cruelty to animals, particularly dogs, they may be restrained from undesired activity in locomotion.

Dogs for instance are often inclined to stray, or to hunt, or chase, when undesired, game, or other animals such as sheep. It is undesirable to hobble a dog, or to keep him unduly chained or otherwise secured to a fixed stationary point.

By means of my invention the control of the dog or other animal is sufficiently secured to prevent running, or hunting, without unduly or injuriously interfering with his freedom of movement.

My invention consists, in its broadest aspect, in applying by universal joint connections to the collar of the dog or other animal, a clog movable in substantially all directions relatively to said collar, which clog has a major dimension greater than the diameter of said collar and is normally suspended from the latter free from the ground when the animal is erect. I prefer to construct said clog in the form of a substantially circular ring, though other forms might be employed.

Referring now to the drawings C indicates a collar of the usual construction, to which the ring or clog A is connected by the means B, as shown, towit: D is a link or ring in which A is movably suspended so as to run freely therethrough. To D is secured a swivel of any approved construction, comprising, for instance stem E, head F and frame G. Said swivel is preferably secured to the slide-plate H. To collar C is secured by bolts *c, c,* slotted track plate K countersunk on its inner face as shown to permit slide plate H to move freely within the limits of slot *k* relatively to collar C, but the swivel might, of course, be bolted or otherwise secured directly to collar C without the slide or track plates, which latter, however, are of advantage in that they admit of a limited lateral play between the collar and the ring and their intermediate supporting means.

Any other means might be employed without departing from my invention to impart to the clog or ring A movement in substantially all directions relatively to collar C.

The operation of my device is as follows: The collar provided with the clog connected thereto by means admitting of substantially universal motion is applied and secured in the usual way as by buckling it securely to the neck of the animal. The clog or ring should, in all instances be greater in diameter or in its major dimension than the diameter of the collar, but should be so proportioned relatively to the animal on which it is employed as to insure that it shall hang and swing clear of the ground when the animal is standing normally erect and stationary. The animal thus accoutered is, with a little practice, enabled to move with sufficient freedom for all practical purposes provided his motion is confined to a walk or short trot. As soon as the animal begins to gallop or run, his body is thereby lowered, at least at intervals, when the ring or clog, contacting with the surface upon which he is progressing, either throws him or so impedes his progress as to render it impossible for him to attain hunting or chasing speed. Besides this, when running through woods, brush, or over obstacles, the ring or clog by catching on projections, soon stops him. Dogs equipped with my clog or ring soon acquire a distaste for hunting or chasing other animals unless the trammel is removed, when they will be found to hunt with greater gusto owing to the freedom imparted.

The universality of motion of the ring or clog relatively to the animal precludes its presenting any material obstacle to the enjoyment and comfort of the latter during ordinary movements. When the dog, stationary, lowers his head to feed or drink, the clog or ring immediately falls, rolls or moves out of his way. The same occurs when the animal lies down. By these means, valuable animals can be at all times restrained from undue movement without impairing such freedom as is requisite to their comfort and health.

Having thus described my invention, what I claim as new and desire to secure by Letters Patent is the following, viz:—

1. A trammel for animals comprising a collar, a ring of greater diameter than said collar, a swivel, means to attach said swivel to said collar and means to suspend said ring from said swivel.

2. A trammel for animals comprising a collar, a ring having a greater diameter than said collar and a swivel secured to said collar and to said ring.

3. The combination of a collar, a ring having a greater diameter than said collar, and a swivel secured to said collar and having a link in which said ring is movably suspended.

4. The combination of a collar, a ring having a greater diameter than said collar, a swivel movably secured to said collar and having a link in which said ring is movably suspended.

5. A trammel for animals comprising a collar, a ring of greater diameter than said collar and a swivel by which said ring is movably suspended to said collar.

WALTER D. EDMONDS.

Witnesses:
PHILIP C. PECK,
GEORGE G. MEASURES.